US011521058B2

(12) United States Patent
Salakhutdinov et al.

(10) Patent No.: US 11,521,058 B2
(45) Date of Patent: Dec. 6, 2022

(54) NEURAL MAP

(71) Applicant: CARNEGE MELLON UNIVERSITY, Pittsburgh, PA (US)

(72) Inventors: Ruslan Salakhutdinov, Pittsburgh, PA (US); Emilio Parisotto, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1171 days.

(21) Appl. No.: 16/017,483

(22) Filed: Jun. 25, 2018

(65) Prior Publication Data

US 2018/0373982 A1 Dec. 27, 2018

Related U.S. Application Data

(60) Provisional application No. 62/524,183, filed on Jun. 23, 2017.

(51) Int. Cl.
*G06N 3/08* (2006.01)
*G06F 16/903* (2019.01)
*G06N 7/00* (2006.01)
*G06N 3/00* (2006.01)
*G06N 3/04* (2006.01)
(Continued)

(52) U.S. Cl.
CPC ........... *G06N 3/08* (2013.01); *G06F 12/0207* (2013.01); *G06F 16/903* (2019.01); *G06N 3/006* (2013.01); *G06N 3/04* (2013.01); *G06N 3/0445* (2013.01); *G06N 3/0454* (2013.01); *G06N 3/082* (2013.01); *G06N 3/10* (2013.01); *G06N 7/005* (2013.01)

(58) Field of Classification Search
CPC ........ G06N 3/08; G06N 3/084; G06N 3/0427; G06F 12/0207
See application file for complete search history.

(56) References Cited

U.S. PATENT DOCUMENTS 10,885,432 B1 * 1/2021 Dulac-Arnold ........ G06N 3/084
2017/0228662 A1 * 8/2017 Gu ........................ G06N 3/0427

OTHER PUBLICATIONS

Nair et al., "Massively Parallel Methods for Deep Reinforcement Learning", Jul. 2015, arXiv:1507.04296v2, pp. 1-14. (Year: 2015).*

(Continued)

*Primary Examiner* — Ying Yu Chen
(74) *Attorney, Agent, or Firm* — K&L Gates LLP (57) ABSTRACT

A computer-implemented system and method for storing data associated with an agent in a multi-dimensional environment via a memory architecture. The memory architecture is structured so that each unique position in the environment corresponds to a unique position within the memory architecture, thereby allowing the memory architecture to store features located at a particular position in the environment in a memory location specific to that location. As the agent traverses the environment, the agent compares the features at the agent's particular position to a summary of the features stored throughout the memory architecture and writes the features that correspond to the summary to the coordinates in the memory architecture that correspond to the agent's position. The system and method allows agents to learn, using a reinforcement signal, how to behave when acting in an environment that requires storing information over long time steps.

22 Claims, 7 Drawing Sheets

(51) Int. Cl.
G06N 3/10 (2006.01)
G06F 12/02 (2006.01)

(56) References Cited

OTHER PUBLICATIONS

Chalmers et al., "Learning to Predict Consequences as a Method of Knowledge Transfer in Reinforcement Learning", Date of Publication: Apr. 17, 2017, IEEE Transactions on Neural Networks and Learning Systems (vol. 29, Issue: 6), pp. 2259-2270. (Year: 2017).*
Zhu et al., "On Improving Deep Reinforcement Learning for POMDPs", Apr. 26, 2017, arXiv:1704.07978v1, pp. 1-7. (Year: 2017).*
D. Bahdanau, K. H. Cho, and Y. Bengio. Neural machine translation by jointly learning to align and translate. In Proceedings of the 3rd International Conference on Learning Representations 2015, 2016.
S. Bhatti, A. Desmaison, O. Miksik, N. Nardelli, N. Siddharth, and P. H. S. Torr. Playing doom with slam-augmented deep reinforcement learning. CoRR, abs/1612.00380, 2016. URL https://arxiv.org/abs/1612.00380.
J. Chung, C. Gulcehre, K. Cho, and Y. Bengio. Empirical evaluation of gated recurrent neural networks on sequence modeling. CoRR, abs/1412.3555, 2014. URL https ://arxiv.org/abs/1412.3555.
A. Graves, G. Wayne, and I. Danihelka. Neural turing machines. CoRR, abs/1410.5401, 2014. URLhttps://arxiv.org/abs/1410.5401.
A. Graves, G. Wayne, M. Reynolds, T. Harley, I. Danihelka, A. Grabska-Barwiska, S. G. Colmenarejo,E. Grefenstette, T. Ramalho, J. Agapiou, A. P. Badia, K. M. Hermann, Y. Zwols, G. Ostrovski, A. Cain, H. King, C. Summerfield, P. Blunsom, K. Kavukcuoglu, and D. Hassabis. Hybrid computing using a neural network with dynamic external memory. Nature, 538: 471-476, 2016.
S. Gupta, J. Davidson, S. Levine, R. Sukthankar, and J. Malik. Cognitive mapping and planning for visual navigation. CoRR, abs/1702.03920, 2017. URL https://arxiv.org/abs/1702.03920.
M. Hausknecht and P. Stone. Deep recurrent q-learning for partially observable mdps. CoRR, abs/1507.06527, 2015. URL https://arxiv.org/abs/1507.06527.
M. Jaderberg, K. Simonyan, and A. Zisserman. Spatial transformer networks. In Advances in Neural Information Processing Systems, pp. 2017-2025, 2015.
L. Kaiser and I. Sutskever. Neural gpus learn algorithms. In Proceedings of the 4th International Conference on Learning Representations 2016, 2016.
Michat Kempka, Marek Wydmuch, Grzegorz Rune, Jakub Toczek, and Wojciech Jaśkowski. ViZDoom: A Doom-based AI research platform for visual reinforcement learning. In IEEE Conference on Computational Intelligence and Games, pp. 341-348, Santorini, Greece, Sep. 2016. IEEE.
K. Kurach, M. Andrychowicz, and I. Sutskever. Neural random-access machines. In Proceedings of the 4th International Conference on Learning Representations 2016, 2016.
G. Lample and D. S. Chaplot. Playing fps games with deep reinforcement learning. CoRR, abs/1609.05521, 2016. URL https://arxiv.org/abs/1609.05521.
Sergey Levine, Chelsea Finn, Trevor Darrell, and Pieter Abbeel. End-to-end training of deep visuomotor policies. Journal of Machine Learning Research, 17(39):1-40, 2016.
A. Miller, A. Fisch, J. Dodge, A. Karimi, A. Bordes, and J. Weston. Key-value memory networks for directly reading documents. CoRR, abs/1606.03126, 2016. URL https://arxiv.org/abs/1606.03126.
V. Mnih, K. Kavukcuoglu, D. Silver, A. A. Rusu, J. Veness, M. G. Bellemare, A. Graves, M. Riedmiller, A. K. Fidjeland, G. Ostrovski, S. Petersen, C. Beattie, A. Sadik, I. Antonoglou, H. King, D. Kumaran, D.Wierstra, S. Legg, and D. Hassabis. Human-level control through deep reinforcement learning. Nature, 518:529-533, 2015.
V. Mnih, A. P. Badia, M. Mirza, A. Graves, T. Harley, T. P. Lillicrap, D. Silver, and K. Kavukcuoglu. Asynchronous methods for deep reinforcement learning. In Proceedings of the 33rd International Conference on Machine Learning (ICML), 2016.
J. Oh, V. Chockalingam, S. Singh, and H. Lee. Control of memory, active perception, and action inminecraft. In Proceedings of the 33rd International Conference on Machine Learning (ICML), 2016.
J.W. Rae, J. J. Hunt, T. Harley, I. Danihelka, A. Senior, G.Wayne, A. Graves, and T. Lillicrap. Scaling memory-augmented neural networks with sparse reads and writes. CoRR, abs/1610.09027, 2016. URL https://arxiv.org/abs/1610.09027.
Stéphane Ross, Geoffrey J Gordon, and Drew Bagnell. A reduction of imitation learning and structured prediction to no-regret online learning. In AISTATS, vol. 1, pp. 6, 2011.
S. Sukhbaatar, A. Szlam, J. Weston, and R. Fergus. End-to-end memory networks. In Advances in Neural Information Processing Systems, pp. 2440-2448, 2015.
R. Sutton and A. Barto. Reinforcement Learning: an Introduction. MIT Press, 2017—Draft of updated version.
Aviv Tamar, Yi Wu, Garrett Thomas, Sergey Levine, and Pieter Abbeel. Value iteration networks. In Advances in Neural Information Processing Systems, pp. 2146-2154, 2016.
R. J. Williams. Simple statistical gradient-following algorithms for connectionist reinforcement learning. Machine Learning, 8(3):229-256, 1992.

* cited by examiner

NEURAL MAP

PRIORITY

The present application claims priority under 35 U.S.C. § 119(e) to U.S. Provisional Patent Application No. 62/524,183, titled NEURAL MAP, filed Jun. 23, 2017, the disclosure of which is herein incorporated by reference in its entirety.

FEDERALLY SPONSORED RESEARCH AND DEVELOPMENT

This invention as made with government support under N00014-16-1-3074 awarded by the Office of Naval Research. The government has certain rights in the invention.

TECHNICAL FIELD

The present disclosure relates to the field of machine learning. Specifically, the present disclosure relates to memory structures for machine learning systems.

BACKGROUND

A critical component to enabling intelligent reasoning in partially observable environments is memory. Despite this importance, Deep Reinforcement Learning (DRL) agents have so far used relatively simple memory architectures, with the main methods to overcome partial observability being either a temporal convolution over the past k frames or a long short-term memory (LSTM) layer. More recent work has gone beyond these architectures by using memory networks which can allow more sophisticated addressing schemes over the past k frames. But even these architectures are unsatisfactory due to the reason that they are limited to only remembering information from the last k frames.

Memory is a crucial aspect of an intelligent agent's ability to plan and reason in partially observable environments. Without memory, agents must act reflexively according only to their immediate percepts and cannot execute plans that occur over an extended time interval. Recently, DRL agents have been capable of solving many challenging tasks such as Atari Arcade Games, robot control, and three-dimensional games such as Doom, but successful behaviors in these tasks have often only been based on a relatively short-term temporal context or even just a single frame. On the other hand, many tasks require long-term planning, such as a robot gathering objects or an agent searching a level to find a key in a role-playing game.

Neural networks that utilize external memories can be distinguished along two main axes: memories with write operators and those without. Writeless external memory systems, often referred to as "Memory Networks," typically fix which memories are stored. For example, at each time step, the memory network would store the past M states seen in an environment. What is learnt by the network is therefore how to access or read from this fixed memory pool, rather than what contents to store within it.

The memory network approach has been successful in language modeling, question answering, and was shown to be a successful memory for DRL agents in complex three-dimensional environments. By side-stepping the difficulty involved in learning what information is salient enough to store in memory, the memory network introduces two main disadvantages. The first disadvantage is that a potentially significant amount of redundant information could be stored. The second disadvantage is that a domain expert must choose what to store in the memory, e.g., for the DRL agent, the expert must set M to a value that is larger than the time horizon of the currently considered task.

On the other hand, external neural memories having write operations are potentially far more efficient, since they can learn to store salient information for unbounded time steps and ignore any other useless information, without explicitly needing any a priori knowledge on what to store. Some current neural memories are based on the types of memory structures that are found in computers, such as tapes, RAM, and GPUs. In contrast to typical recurrent neural networks, these neural computer emulators have far more structured memories which follow many of the same design paradigms that digital computers have traditionally utilized. One such model, the Differentiable Neural Computer (DNC) and its predecessor the Neural Turing Machine (NTM), structure the architecture to explicitly separate memory from computation. The DNC has a recurrent neural controller that can access an external memory resource by executing differentiable read and write operations. This allows the DNC to act and memorize in a structured manner resembling a computer processor, where read and write operations are sequential and data is store distinctly from computation. The DNC has been used successfully to solve complicated algorithmic tasks, such as finding shortest paths in a graph or querying a database for entity relations.

SUMMARY

In one general aspect, the present disclosure describes an inventive memory system with an adaptable write operator that is customized to the sorts of multi-dimensional environments that DRL agents typically interact with. This architecture, referred to as a neural map, uses a spatially structured memory image to learn to store arbitrary information about the environment over long time lags, wherein the structure of the memory spatially corresponds to the environment. The memory architecture described herein surpasses DRL memory architectures previously known in the art in navigating challenging two- and three-dimensional maze environments. Furthermore, the memory architecture described herein is capable of generalizing to environments that were not seen during training.

The neural map architecture as described herein overcomes some of the shortcomings of the previously mentioned neural memories. First, it uses an adaptable write operation so that its size and computational cost does not grow with the time horizon of the environment, as it does with memory networks. Second, the write operation has an inductive bias so that the neural map architecture is 1) well suited to three-dimensional environments where navigation is a core component of successful behaviors, and 2) uses a sparse write operation that prevents frequent overwriting of memory locations that can occur with NTMs and DNCs. To accomplish this, the presently described system includes a DNC-style external memory in the form of a two-dimensional map, where each position in the map is a distinct memory.

In various aspects, the neural map architecture can be applied to two-dimensional partially-observable maze-based environments, wherein outperforms LSTM and memory network policies currently known in the art. The neural map can additionally be applied to three-dimensional and other n-dimensional environments.

FIGURES

Various embodiments of the present invention are described herein by way of example in connection with the following figures, wherein.

DESCRIPTION

The present disclosure describes an inventive computer system and method of reading, storing, and updating a memory architecture for use with, e.g., neural networks. In various aspects, the system is usable for DRL agents acting in a multi-dimensional space, e.g., a two- or three-dimensional environment. The present system can include a memory architecture, referred to throughout this disclosure as a "neural map," which may serve as the internal memory storage of a DRL agent, and/or various computer-executable operations to interact with the memory architecture. The computer-executable operations can be, e.g., stored as program instructions in a memory (which may be the same or a different memory than the aforementioned memory architecture) that are executed by a processor. The internal memory storage architecture of the computer system can be read from and written to by the DRL agent via the operations as the DRL agent interacts with its environment. However, the write operator of the present system is selectively limited to affect only the part of the neural map that represents the area where the agent is currently located. For conciseness, the present system and method will be described primarily as utilized with a DRL traversing a two-dimensional map. However, the principles discussed herein can be extended to three-dimensional or even higher-dimensional maps (e.g., a four-dimensional map with a three-dimensional sub-map for each cardinal direction the agent can face).

Figure 1A:
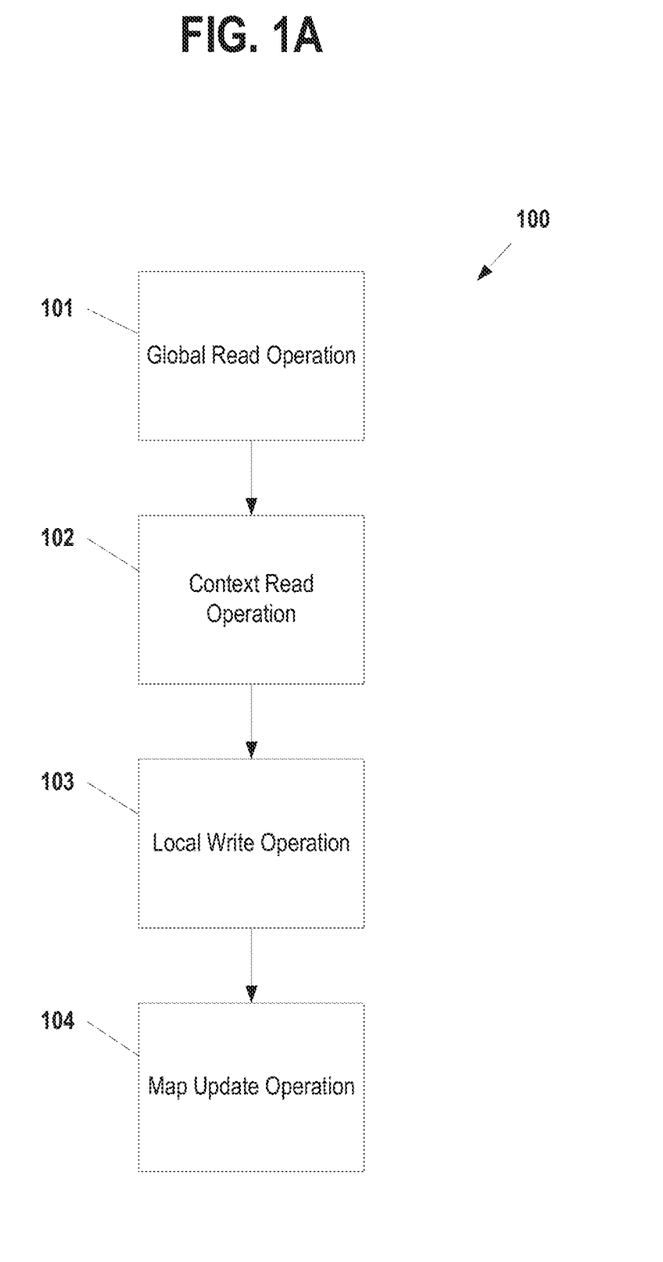
FIGS. 1A and 1B illustrate a process for reading and updating a memory architecture, in accordance with one or more aspects of the present disclosure.
Figure 1B:
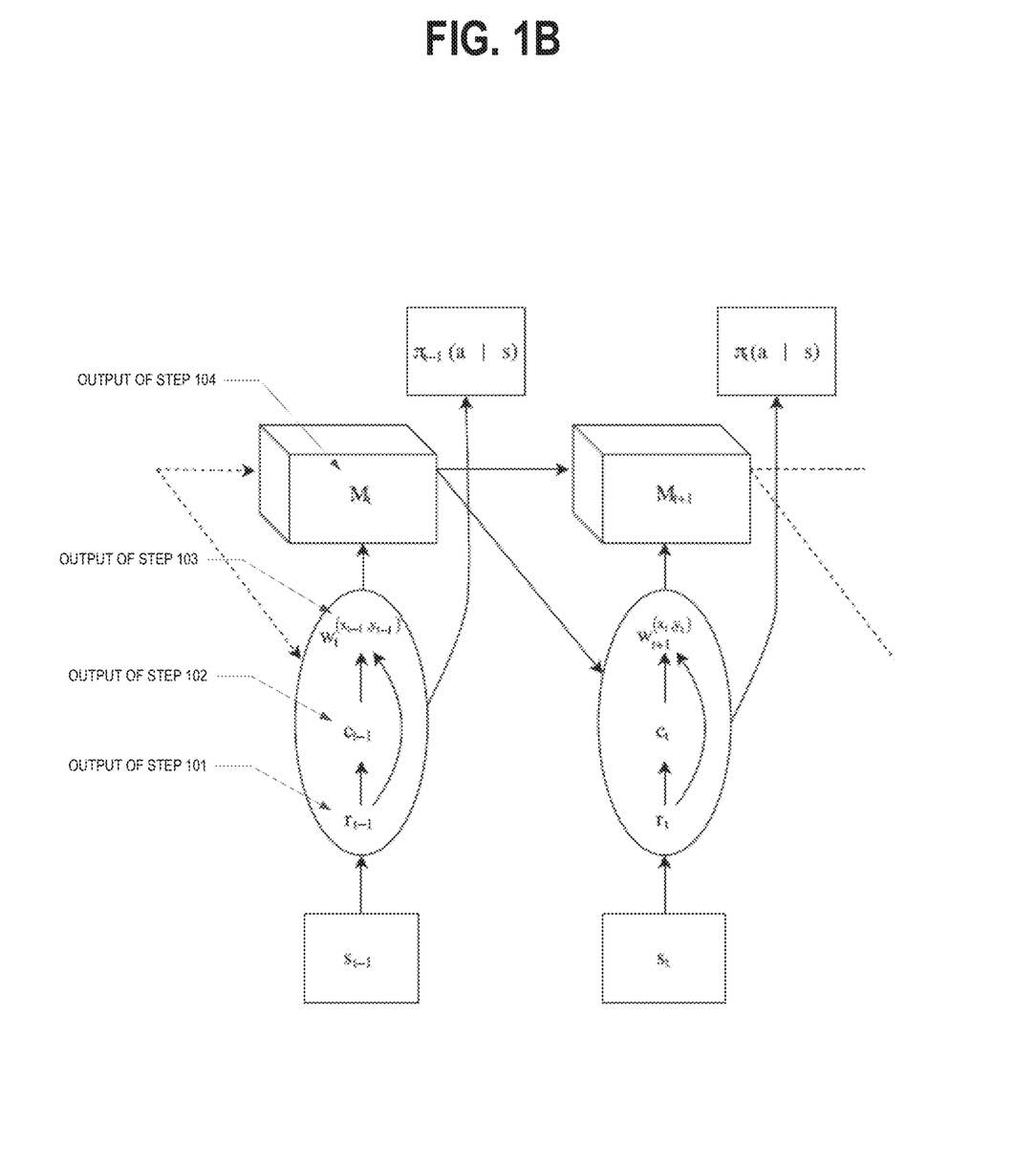
Figure 2:
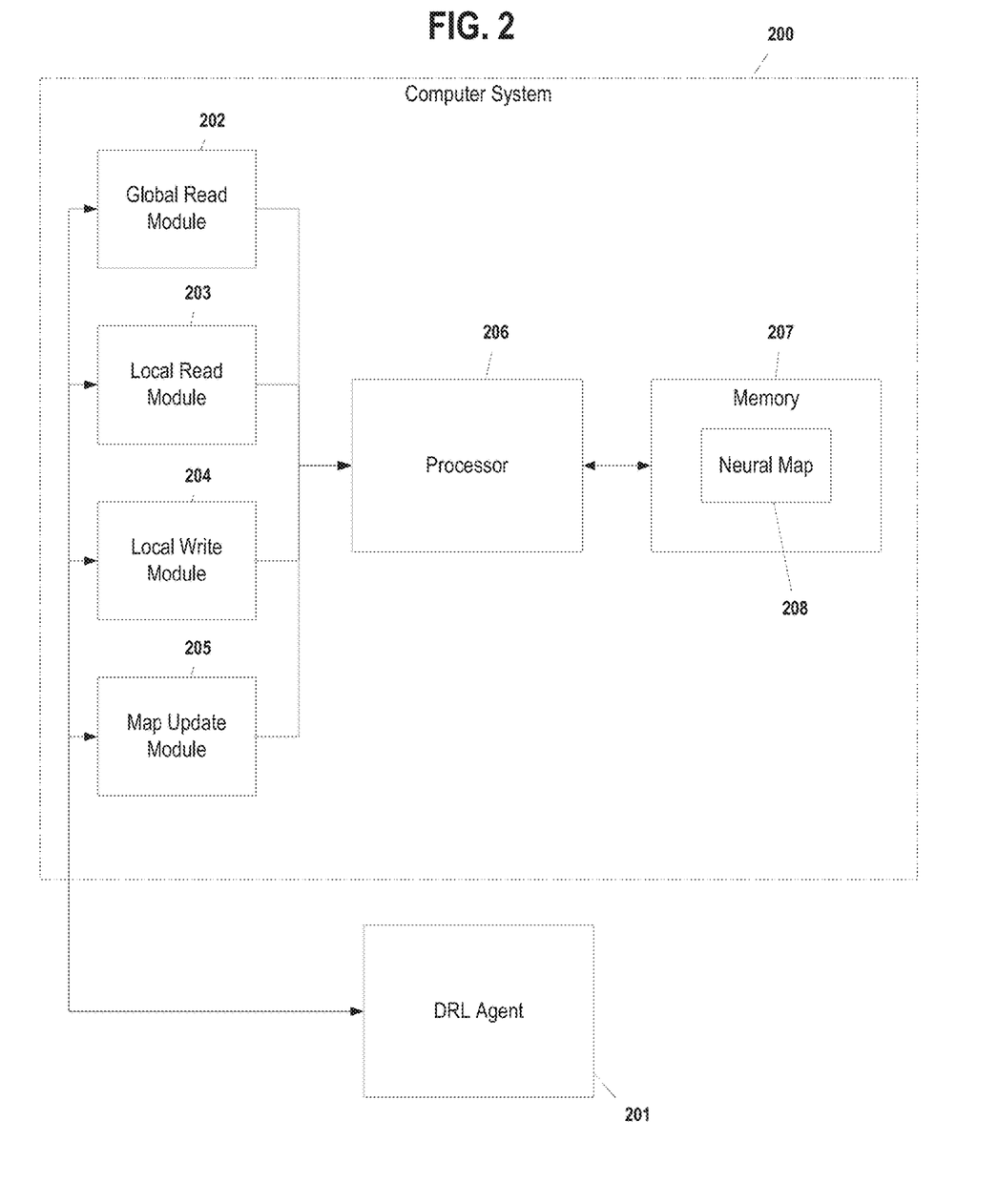
FIG. 2 is a block diagram of a computer system for performing the process illustrated in FIGS. 1A and 1B, in accordance with one or more aspects of the present disclosure.

FIGS. 1A and 1B collectively illustrate a process 100 for reading and updating a memory architecture, in accordance with one or more aspects of the present disclosure. FIG. 1A is a logic flowchart of the process 100 and FIG. 1B provides a visualization of the same process. Reference should also be made to FIG. 2, which is an exemplary block diagram of a computer system 200 for performing the process illustrated in FIG. 1A, in accordance with one or more aspects of the present disclosure. The DRL agent's position represented in a two-dimensional environment as $(x, y)$ with $x \in \mathbb{R}$, $y \in \mathbb{R}$. The neural map M can be represented as a $C \times H \times W$ feature block, where C is the feature dimension, H is the vertical extent of the map and W is the horizontal extent. There exists a coordinate normalization function $(x', y')$ such that every unique $(x, y)$ can be mapped into $(x', y')$, where $x' \in \{0, \ldots, W\}$ and $y' \in \{0, \ldots, H\}$. In other words, the neural map M is structured so that each unique $(x, y)$ position in the environment corresponds to a corresponding unique position $(x', y')$ within the memory architecture, thereby allowing the memory architecture to store features located at a $(x, y)$ position in the environment in a memory location specific to that location. The memory architecture thus functions as a "map" of the environmental features that corresponds to the environment. For ease of notation, suppose in the sequel that all coordinates have been normalized by $\psi$ into neural map space. Furthermore, $s_t$ can represent the current state embedding, $M_t$ can represent the current neural map, and $(x_t, y_t)$ can represent the current position of the agent.

Given these definitions, the executable instructions for interacting with and modifying the neural map memory architecture can be defined by a set of operations including a global read operation, a context read operation, a local write operation, and a map update operation. These various operations are described in further detail below and can be represented according to the following algorithms:

$r_t = \text{read}(M_t);$ $c_t = \text{context}(M_t, s_t, r_t);$ $w_{t+1}^{(x_t, y_t)} = \text{write}(s_t, r_t, c_t, M_t^{(x_t, y_t)});$ $M_{t+1}^{(x_t, y_t)} = \text{update}(M_t, w_{t+1}^{(x_t, y_t)});$ $o_t = [r_t, c_t, w_{t+1}^{(x_t, y_t)}];$ and $\pi_t(a|s) = \text{Softmax}(f(o_t)).$ In the algorithms above, $w_t^{(x_t, y_t)}$ represents the feature at position $(x_t, y_t)$ at time t, $[x_1, \ldots, x_k]$ represents a concatenation operation, and $o_t$ is the output of the neural map at time t, which is then processed by another deep network f to get the policy outputs $\pi_t(a|s)$. For each step or action by the DRL agent at time t, the process 100 executes a series the aforementioned algorithms or processes.

In one aspect, the process 100, at step 101, executes a global read operation that generates a summary of the information throughout the neural map memory architecture. Specifically, the global read operation passes the current neural map $M_t$ through a deep convolutional network to produce a C-dimensional feature vector $r_t$. The global read vector $r_t$ summarizes information of the entire map.

In another aspect, the process, at step 101, can execute a localized read operation instead of the global read operation described above. The localized read option passes a spatial subset of the current neural map $M_t$ through a deep convolutional network, instead of the entire current neural map $M_t$. For example, the localized read operation can include utilizing a Spatial Transformer Network to attentively sub-sample the neural map at particular locations scales. This aspect can be beneficial in implementations where it would be computationally expensive to process the entirety of the neural map at each o the agent's steps or actions, such as when the environment requires a large or high-resolution neural map.

In one aspect, the process 100, at step 102, executes a local read operation, also referred to as the context operation, that reads the memory of the neural map at the specific location at which the agent is located within the environment. Specifically, the local read operation performs a context-based addressing to check whether certain features are stored in the neural map. The local read operation takes the current state embedding $s_t$ and the current global read vector $r_t$ as input and produces a query vector $q_t$. The inner product of the query vector $q_t$ and each feature vector $M_t^{(x,y)}$ in the neural map is then taken to get scores $a_t^{(x,y)}$ at all positions (x,y). The scores are then normalized to get a probability distribution $a_t^{(x,y)}$ over every position in the map, which is also referred to as "soft attenuation" in the art. This probability distribution is used to compute a weighted average $c_t$ over all features $M_t^{(x,y)}$. The local read operation can thus be summarized according to the following algorithms:

$$q_t = W[s_t, r_t];$$

$$a_t^{(x,y)} = q_t \cdot M_t^{(x,y)};$$

$$\alpha_t^{(x,y)} = \frac{e^{a_t^{(x,y)}}}{\sum_{(w,z)} a_t^{(w,z)}}; \text{ and}$$

$$c_t = \sum_{(x,y)} \alpha_t^{(x,y)} M_t^{(x,y)}.$$

In the algorithms above, W is a weight matrix. The context read operation or local read operation executed at step 102 allows the neural map to operate as an associative memory: the agent provides some possibly incomplete memory (the query vector $q_t$) and the local read operation will return the completed memory that most closely matches $q_t$. Stated differently, the agent can, for example, query whether it has seen something similar to a particular landmark that is currently within its view. The ability to query the neural map to determine whether the agent has seen a similar feature or landmark previously then allows the agent to make decisions about what is and is not important information to store, which is in contrast to some other memory architectures currently existing in the art wherein the agent stores the entirety of what is within its view for each incremental time step.

In another aspect, the process 100, at step 102, can execute a key-value context read operation instead of the context read operation described above. The key-value context read operation imposes a stronger bias on the context read operation by splitting each feature of the neural map into two parts, $M_t^{(x,y)} = [k_t^{(x,y)}, v_t^{(x,y)}]$, where $k_t^{(x,y)}$ is the (C/2)-dimensional "key" feature and $v_t^{(x,y)}$ is the (C/2)-dimensional "value" feature. The key features are matched against the query vector (which is now a (C/2)-dimensional vector) to get the probability distribution $a_t^{(x,y)}$. The weighted average is then taken over the value features. The key-value context read operation can thus be summarized according to the following algorithms:

$$q_t = W[s_t, r_t];$$

$$M_t^{(x,y)} = [k_t^{(X,Y)}, v_t^{(x,y)}]$$

$$a_t^{(x,y)} = q_t \cdot k_t^{(x,y)};$$

$$\alpha_t^{(x,y)} = \frac{e^{a_t^{(x,y)}}}{\sum_{(w,z)} a_t^{(w,z)}}; \text{ and}$$

$$c_t = \sum_{(x,y)} \alpha_t^{(x,y)} v_t^{(x,y)}.$$

Having distinct key and value features allows the network to more explicitly separate the addressing feature space from the content feature space.

In one aspect, the process 100, at step 103, executes a local write operation that allows the agent to write data to the memory of the neural map corresponding to the position at which the agent is located. Specifically, for an agent's current position $(x_t, y_t)$ at time t, the local write operation takes as input the current state embedding $s_t$, the global read output $r_t$, the context read vector $c_t$, and the current feature at position $(x_t, y_t)$ in the neural map $M_t^{(x_t,y_t)}$ and produces, using a deep neural network f, a new C-dimensional vector $w_{t+1}^{(x_t,y_t)}$. This vector functions at the new local write candidate vector at the current position $(x_t, y_t)$:

$$w_{t+1}^{(x_t,y_t)} = f([s_t, r_t, c_t, M_t^{(x_t,y_t)}]).$$

As described, the local write operation hard rewrites the vector at the agent's current position with a new feature vector produced by a deep network. In another aspect, the process 100, at step 103, can instead execute a gated write operation. The gated write operation can be based on the recurrent update equations of a Gated Recurrent Unit. The gated write operation can thus be summarized according to the following algorithms:

$$r_{t+1}^{(x_t,y_t)} = \sigma(W_r[s_t, r_t, c_t, M_t^{(x_t,y_t)}]);$$

$$\hat{w}_{t+1}^{(x_t,y_t)} = \tanh(W_{\hat{h}}[s_t, r_t, c_t] + U_{\hat{h}}(r_{t+1}^{(x_t,y_t)} \odot M_t^{(x_t,y_t)}));$$

$$z_{t+1}^{(x_t,y_t)} = \sigma(W_z[s_t, r_t, c_t, M_t^{(x_t,y_t)}]); \text{ and}$$

$$w_{t+1}^{(x_t,y_t)} = (1 - z_{t+1}^{(x_t,y_t)}) \odot M_t^{(x_t,y_t)} + z_{t+1}^{(x_t,y_t)} \odot \hat{w}_{t+1}^{(x_t,y_t)}.$$

In the algorithms above, $x \odot y$ is the Hadamard product between vectors x and $\sigma(\cdot)$ is the sigmoid activation function, and $W_*$ and $U_*$ are weight matrices. Further, $r_{t+1}^{(x_t,y_t)}$ is the reset gate, $\hat{w}_{t+1}^{(x_t,y_t)}$ is the candidate activation, and $z_{t+1}^{(x_t,y_t)}$ is the update gate. By utilizing reset and update gates, the gated write operation can modulate how much the new write vector should differ from the current stored feature(s) at the agent's current location. The gated write operation can, in some aspects, maintain information over long time lags as compared to ungated networks.

In one aspect, the process 100, at step 104, executes a map update operation that updates the neural map with the new data as per the local write operation at step 103. Specifically, the map update operation creates a new neural map $M_{t+1}$, which is equal to the old neural map $M_t$, except at the current agent position $(x_t, y_t)$, where the current write candidate vector $w_{t+1}^{(x_t,y_t)}$ is stored:

$$M_{t+1}^{(a,b)} = \begin{cases} w_{t+1}^{(x_t,y_t)}, & \text{for } (a,b) = (x_t, y_t) \\ M_t^{(a,b)}, & \text{for } (a,b) \neq (x_t, y_t) \end{cases}$$

The process 100 then repeats, iteratively executing each of the steps 101-104 described above for each step taken by the agent in the environment (e.g., a two-dimensional environment). The process 100 can continue the process of iteratively updating the memory of the neural map at each of the agent's positions until the agent ceases function or the process 100 is otherwise halted.

FIG. 2 is a block diagram of a computer system 200 for performing the process illustrated in FIG. 1, in accordance with one or more aspects of the present disclosure. The computer system 200 comprises a set of one or more processor cores 206 and a memory 207 (e.g., RAM, ROM, or secondary storage, such as a HDD) for storing the neural map 208. The computer system 200 is configured to communicatively interact with a DRL agent 201 via a plurality of modules that allow the DRL agent 201 to read from and write to the neural map 208 stored in the memory 207, as described above with respect to the process 100. The computer system 200 and the DRL agent 201 can be communicatively coupled via any means known in the art, such as a direct wired connection (e.g., a high speed data bus) or a network connection (e.g., a LAN or the Internet).

In one aspect, the computer system 200 further comprises a global read module 202 configured to execute the global read operation, a local read module 203 configured to execute the local read operation, a local write module 204 configured to execute the local write operation, and the map update module 205 configured to execute the map update operation. In other aspects, the computer system 200 can comprise modules, in addition to or in lieu of the depicted modules 202-205, for the various other operations discussed herein. In one aspect, each of the modules 202-205 comprises a set of program instructions stored on a memory (e.g., RAM or ROM, which may or may not be the same memory 207 storing the neural map 208) that, when executed by the set of processor cores 206, allow the computer system 200 to execute the operations described above that are embodied by the program instructions. In another aspect, either the modules 202-205 as a whole or each of the modules 202-205 individually comprises a circuit, such as an ASIC or FPGA, embodying a logic configured to execute the aforementioned operations.

The processor cores 206 can include, for example, one or more CPU, GPU, or AI accelerator cores. GPU cores operate in parallel and, hence, can typically process data more efficiently that a collection of CPU cores, but all the cores execute the same code at one time. AI accelerators are a class of microprocessor designed to accelerate artificial neural networks. They typically are employed as a co-processor in a device with a host CPU as well. An AI accelerator typically has tens of thousands of matrix multiplier units that operate at lower precision than a CPU core, such as 8-bit precision in an AI accelerator versus 64-bit precision in a CPU core. In aspects wherein the processor cores 206 comprise GPU cores, the GPU cores, the memory 207, and/or the modules 202-205 can be embodied as a single GPU device. In arrangements where there is multiple processor cores, the processor cores can be configured to work in tandem by, e.g., performing calculations concurrently, as in a series of GPUs working in parallel. In other aspects, each of the modules 202-205 can comprise a dedicated processor core or set of processor cores configured to executes the operations of each individual module. In such aspects, the set of processors can be communicatively coupled to each other and to the memory 207.

Figure 3:
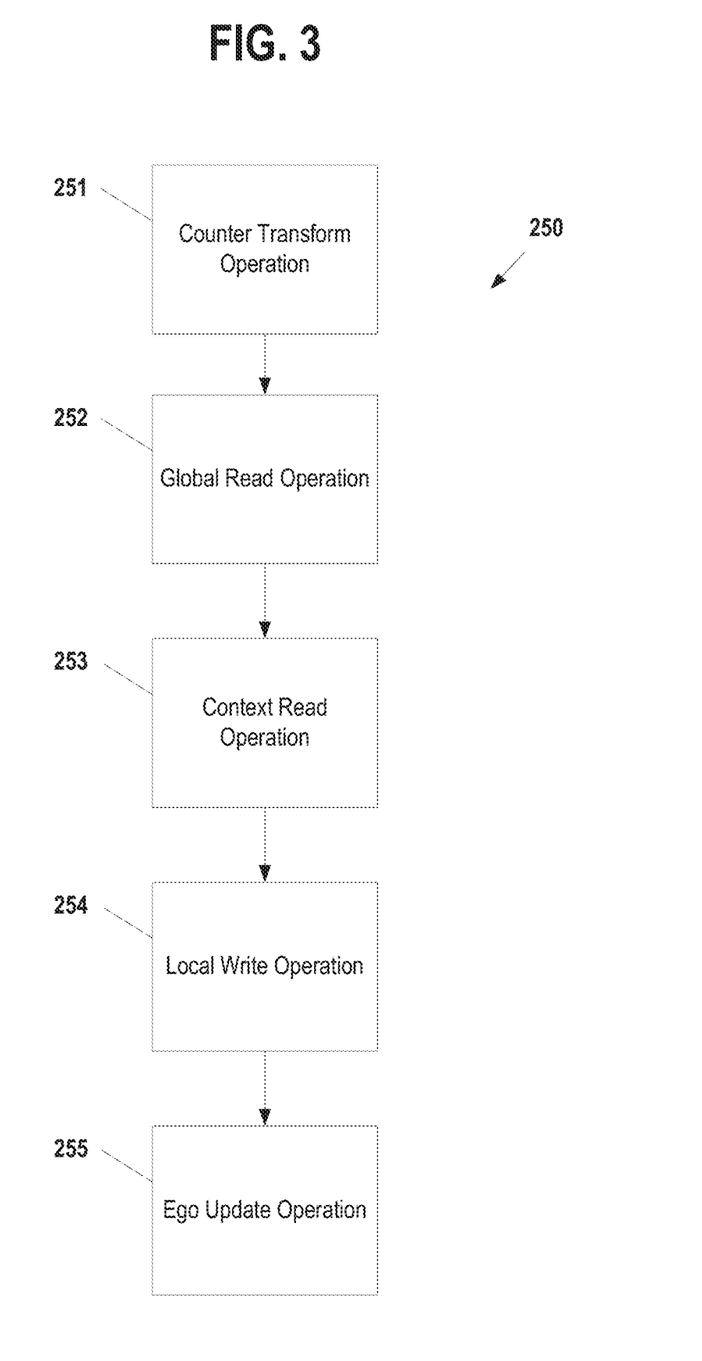
FIG. 3 illustrates a process for egocentrically reading and updating a memory architecture, in accordance with one or more aspects of the present disclosure.
Figure 4:
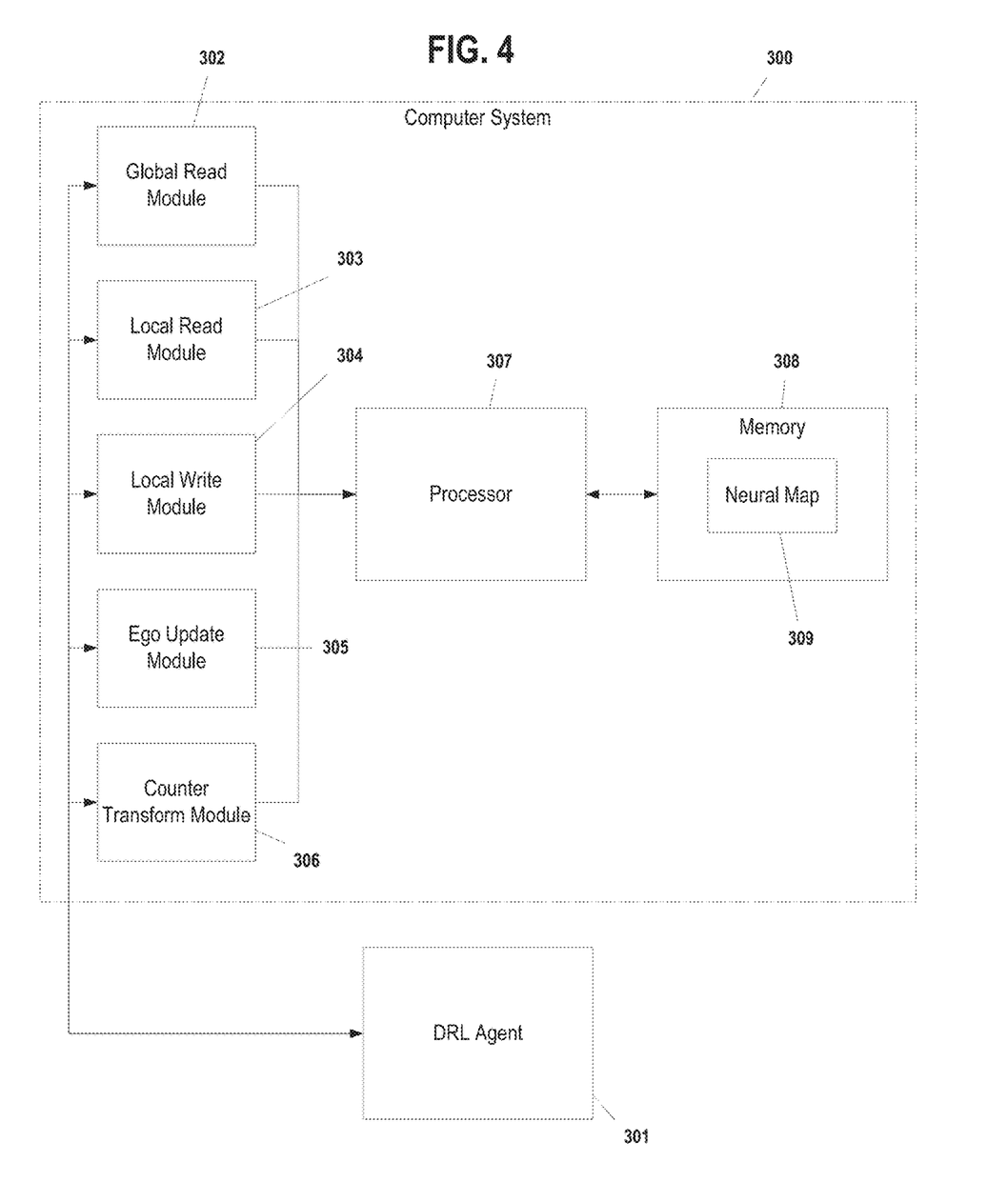
FIG. 4 is a block diagram of a computer system for performing the process illustrated in FIG. 3, in accordance with one or more aspects of the present disclosure.

In the aspect of the present system and method described above, the neural map requires the current (x, y) position of the agent as input. However, the system can be further generalized to obviate this requirement. FIG. 3 is a logic flowchart of a process 250 for egocentrically reading and updating a memory architecture. Reference should also be made to FIG. 4, which is an exemplary block diagram of a computer system 300 for performing the process 250 illustrated in FIG. 3, in accordance with one or more aspects of the present disclosure. As above, the computer system 300, which is configured to be communicatively coupled to a DRL agent 301, comprises a processor 307 coupled to a memory 308 storing a neural map 309. The computer system 300 further comprises a global read module 302, a local read module 303, and a local write module 304 that are functionally equivalent to the corresponding modules in the previously described aspect. However in this aspect, the computer system 300 further comprises an ego update module 305 and a counter transform module 306. In this aspect, rather than using an absolute position (x,y) of the agent, the neural map instead utilizes the relative position of the agent as input. This is expressed mathematically by assuming that the agent moves through the environment between time steps with a velocity (u,v), which thus means that the map can be counter-transformed by (−u, −v) in order to account for the relative position of the agent. Stated differently, each feature of the map is shifted in the H and W dimensions according to the counter-transformation (−u, −v). This means that the neural map will function egocentrically, i.e., the agent's position will be represented mathematically as staying stationary in the center of the neural map, while the environment as defined by the map moves around the agent. Therefore, the agent's current position (x, y) is no longer required as an input; rather, the agent's velocity is required. This alternative aspect can be useful in environments where the agent's absolute position (x,y) is comparatively more difficult to ascertain than the agent's velocity.

In this aspect, a function represented by $\varepsilon(u',v')$ discretizes the agent velocities $(u',v')$ such that they represent valid velocities within the neural map $(u,v)$. Furthermore, all velocities have been properly normalized by $\varepsilon$ into the neural map space. These various operations are described in further detail below and can be represented according to the following algorithms:

$$\overline{M}_t = \text{CounterTransform}(M_t(u_t,v_t))$$

$$r_t = \text{read}(\overline{M}_t);$$

$$c_t = \text{context}(\overline{M}_t, s_t, r_t);$$

$$w_{t+1}^{(pw,ph)} = \text{write}(s_t, r_t, c_t, \overline{M}_t^{(pw,ph)});$$

$$M_{t+1} = \text{egoupdate}(\overline{M}_t, w_{t+1}^{(pw,ph)});$$

$$o_t = [r_t, c_t, w_{t+1}^{(pw,ph)}]; \text{ and}$$

$$\pi_t = \text{Softmax}(f(o_t)).$$

In the algorithms above, (pw, ph) represents the center position of the neural map, $\overline{M}_t$ is the current neural map reversed transformed by the current velocity $(u_t, v_t)$ so that the agent's map position remains in the center (pw, ph).

In one aspect, the process 250, at step 251, executes the counter transform operation via the counter transform module 306. The counter transform operations transforms the current neural map $M_t$ by the inverse of the agent's current velocity $(u_t,v_t)$. The counter transform operation can be represented according to the following algorithm:

$$\overline{M}_t^{(a,b)} = \begin{cases} M_{t+1}^{(a-u,b-v)}, & \text{for } (a-u) \in \{1, \ldots, W\} \wedge (b-v) \in \{1, \ldots, H\} \\ 0, & \text{else} \end{cases}$$

The aspect of the operation described above represents a reverse translation; however, in alternative aspects, the operation can be utilized to account for rotations by the agent as well, if the agent can measure its angular velocity.

In one aspect, the process 250, at step 252, executes the read operation via the global read module 302; at step 253, executes the context operation via the local read module 303; and, at step 254, executes the write operation via the local write module 304. These operations function similarly to the corresponding operations described above with respect to the process 100 utilizing the absolute position (x, y) of the agent and are represented by the algorithms provided above.

In one aspect, the process 250, at step 255, executes the ego update operation via the ego update module 305. The ego update operation is functionally equivalent to the update operation described above with respect to the process 100 utilizing the absolute position (x, y) of the agent, with the only difference being that only the center position (pw, ph) is ever written to:

$$M_{t+1}^{(a,b)} = \begin{cases} w_{t+1}^{(pw,ph)}, & \text{for } (a, b) = (pw, ph) \\ \overline{M}_t^{(a,b)}, & \text{for } (a, b) \neq (pw, ph) \end{cases}$$

The various other operations discussed above with respect to aspects of this disclosure utilizing the absolute position (x, y) of the agent (e.g., the localized read operation or the gated write operation) are likewise applicable to the aspects of this disclosure utilizing the velocity (u, v) of the agent as input.

The function of the present system and method has been described in the context of general applications to a DRL agent traversing a two-dimensional environment. In order to further illustrate the principles described herein, the present disclosure will now turn to particular implementations of the present system as utilized in the context of a two-dimensional and a three-dimensional maze-based environment wherein a memory is crucial for optimizing the behavior of a DRL agent. In these various illustrative implementations, the presently disclosed system outperforms currently existing memory architectures for DRL agents.

Figure 5:
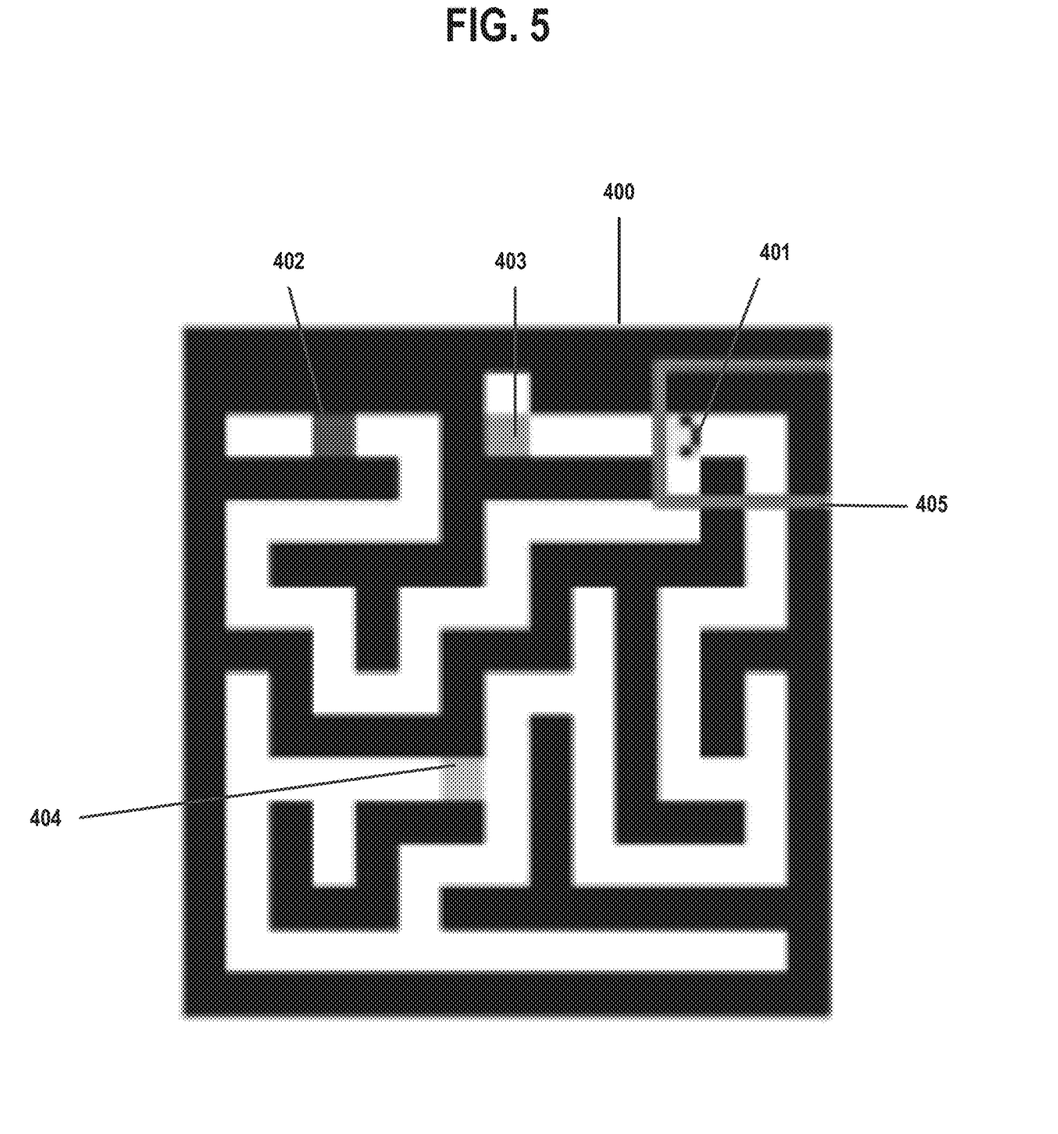
FIG. 5 depicts a maze to be traversed by a DRL agent utilizing a neural map, in accordance with one or more aspects of the present disclosure.
Figure 6:
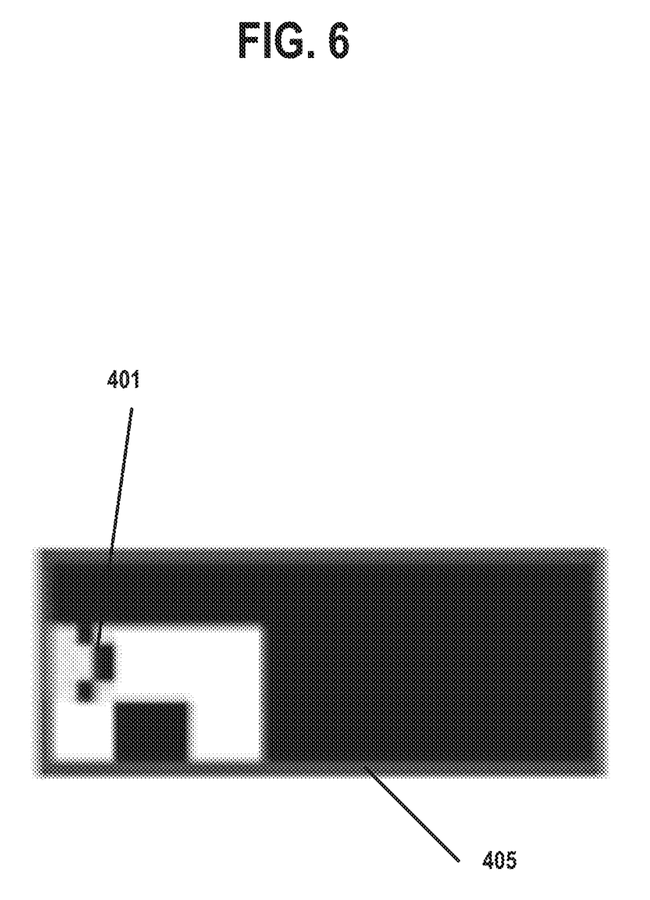
FIG. 6 depicts a section of the maze of FIG. 5 observed by the DRL agent, in accordance with one or more aspects of the present disclosure.

In one implementation, the presently described system is adapted for a two- or three-dimensional "goal-search" environment wherein the agent starts in a fixed starting position within some randomly generated maze with two randomly positioned goal states. FIG. 5 depicts a maze 400 to be traversed by a DRL agent 401 utilizing a neural map memory architecture, in accordance with one or more aspects of the present disclosure. Reference should also be made to FIG. 6, which depicts the section 405 of the maze 400 of FIG. 5 that is observed by the DRL agent 401 at the agent's 401 current location. In this implementation, the agent 401 observes an indicator 403 at a fixed position near the starting state. This indicator 403 will tell the DRL agent 401 whether to proceed to a first goal 402 or a second goal 404. The indicator 403 can comprise a first identifiable characteristic, such as a first color, corresponding to the first goal 402 and a second identifiable characteristic, such as a second color, corresponding to the second goal 404. If the agent 401 goes to the correct goal, it gains a positive reward. If the agent 401 goes to the incorrect goal, it gains a negative reward. Therefore the agent 401 needs to remember the indicator 403 as it searches for the correct goal state.

A random generator can be utilized to generate a set of random mazes for training the agent 401 and a held-out set of random mazes can be kept for testing. This test set therefore represents maze geometries that have never been seen during training, which can then be used to measure the agent's 401 ability to generalize to new environments. In one aspect, the mazes sampled during training range from a size of 5×5 to 15×15. In the maze generation process, maze sizes can first be sampled uniformly prior to generating the maze. Sampling different maze sizes from easy to difficult during training is similar to a style of curriculum learning. In one aspect, any particular episode, i.e., an attempt by the agent 401 to traverse the maze 400, is terminated if the agent 401 takes a threshold number of steps (e.g., 100, 420, 500, etc.) without reaching the goal.

In an illustrative aspect, the agent's 401 state observations are a 5×15×3 subsample of the complete maze, as depicted in FIG. 6, so that the agent is able to see fifteen pixels forward and three pixels on the side (i.e., including the center pixel and one pixel on each side of the agent). The observable section 405, i.e., the agent's 401 "view," is obscured so the agent is prevented from seeing the identity of anything behind walls. The five binary channels in the state observation represent object identities: the first channel represents presence of walls, the second channel represents the first identity of the indicator 403, the third channel represents the second identity of the indicator 403, the fourth channel represents the first goal 402, and the fifth channel represents the second goal 404.

In the illustrative aspect, a DRL agent 401 utilizing the presently described neural map memory architecture generally outperforms baseline memory networks utilizing 128 LSTM units and MemNN, which is a memory network-based architecture that performs attention over the past 32 states seen, models for solving the described "goal-search" environment. The table below summarizes the results of the percentage of successful episodes for each memory architecture type:

| | Goal-Search | | | | | |
| --- | --- | --- | --- | --- | --- | --- |
| | Train | | | Test | | |
| Agent | 7-11 | 13-15 | Total | 7-11 | 13-15 | Total |
| Random | 41.9% | 25.7% | 38.1% | 46.0% | 29.6% | 38.8% |
| LSTM | 84.7% | 74.1% | 87.4% | 96.3% | 83.4% | 91.4% |
| MemNN-32 | 80.2% | 64.4% | 83.3% | 95.9% | 74.6% | 87.4% |
| MemNN-64 | 83.2% | 69.6% | 85.8% | 96.5% | 76.7% | 88.3% |
| Neural Map (15 × 15) | 92.4% | 80.5% | 89.2% | 93.5% | 87.9% | 91.7% |
| Neural Map + GRU (15 × 15) | 97.0% | 89.2% | 94.9% | 97.7% | 94.0% | 96.4% |
| Neural Map + GRU (8 × 8) | 94.9% | 90.7% | 95.6% | 98.0% | 95.8% | 97.3% |
| Neural Map + GRU + Pos (8 × 8) | 95.0% | 91.0% | 95.9% | 98.3% | 94.3% | 96.5% |
| Neural Map + GRU + Pos (6 × 6) | 90.9% | 83.2% | 91.8% | 97.1% | 90.5% | 94.0% |
| Ego Neural Map + GRU (15 × 15) | 94.6% | 91.1% | 95.4% | 97.7% | 92.1% | 95.5% |
| Ego Neural Map + GRU + Pos (15 × 15) | 74.6% | 63.9% | 78.6% | 87.8% | 73.2% | 82.7% |

For implementations adapted for a three-dimensional environment, the DRL agent can be trained to traverse the three-dimensional environment by receiving color images of the environment as the agent moves therethrough, using a deep network as a state embedding. The state observations can be, for example, some number of previous color images (e.g., 100×75 RGB). The network can be, for example, pre-initialized with the weights from a network trained to traverse the environment. Mapping from real positions to neural map space can be accomplished using nearest neighbor quantization. In one implementation, the mazes consist of a plurality of rooms of a particular size (e.g., 3×3 units), wherein a wall could be generated between any adjacent room and a tower can be located at the center of a room. The overall map can have a size of, e.g., 32×9×9. Under these conditions, a DRL agent utilizing the presently described neural map memory architecture once again outperformed LSTM and MemNN baselines. The table below summarizes the results of the percentage of successful episodes for each memory architecture type:

| Agent | Training Map | Unseen Maps |
|---|---|---|
| Random | 20.9% | 22.1% |
| MemNN | 68.2% | 60.3% |
| LSTM | 69.2% | 52.4% |
| LSTM + Neural Map (GRU) | 78.3% | 66.6% |

Embodiments of the present invention can be used to improve many different types of machine learning systems, including deep neural networks, in a variety of applications. In addition to the goal-search implementations described above, embodiments of the present invention can be utilized to improve any machine learning-based system that is configured to traverse through an environment or any other such implementation wherein a machine learning system needs to remember past information or execute tasks requiring strategies that depend on more than the immediately observable area around the system.

Each processor for the systems described in connection with FIG. 2 and FIG. 4 could have one or multiple cores. The cores could be CPU or graphical processing unit (GPU) cores, for example. For example, in an embodiment with multiple CPU cores, one set of cores could execute the program instructions for the global read module, another set for the local read module, and so on. GPU cores operate in parallel and, hence, can typically process data more efficiently that a collection of CPU cores, but all the cores execute the same code at one time. The memory unit(s) may comprise computer memory that is accessible by the processing cores, such as RAM, ROM, processor registers or processor cache, for example.

The software for the various machine learning systems described herein, such as the modules described in FIG. 2 and FIG. 4, and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, M L; and examples of scripting languages include Bourne script, JavaScript, Python, Ruby, Lua, PHP, and Perl.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

In one general aspect, therefore, the present invention is directed to a computer-implemented method for storing data associated with an agent in a multi-dimensional environment via a memory architecture. The memory architecture utilizes a coordinate system that stores one or more features of the environment at coordinates that correspond to the coordinates of the multi-dimensional environment. The method includes generating, by a set of one or more processor cores, a summary of the one or more features stored throughout the memory architecture. The method further includes retrieving, by the set of processor cores, one or more candidate features corresponding to a position at which the agent is located from the coordinates of the memory architecture corresponding to the position. The method further includes determining, by the set of processor cores, whether the one or more candidate features correspond to the summary of the one or more stored features of the memory architecture. The method still further includes updating, by the set of processor cores, the memory architecture with the one or more candidate features at the coordinates in the memory architecture that correspond to the summary of the one or more stored features of the memory architecture.

In one aspect, the method is iteratively repeated for each position of the agent as the agent traverses the multi-dimensional environment.

In one aspect, the summary of the one or more features stored throughout the memory architecture is generated by passing the memory architecture through a neural network to generate a C-dimensional feature vector, wherein C is a number of features associated with the environment.

In one aspect, it is determined whether the one or more candidate features correspond to the summary of the one or more stored features of the memory architecture comprises by computing a query vector $q_t$ according to a current state embedding $s_t$ and a feature vector $r_t$ and computing a weighted average $c_t$ according to $q_t$ and each feature vector in the memory architecture.

In one aspect, the memory architecture is updated with the one or more candidate features at the coordinates in the memory architecture that correspond to the summary of the one or more stored features of the memory architecture comprises by generating a new memory architecture including the data stored in the memory architecture, except with the one or more candidate features that correspond to one or more stored features written to the corresponding coordinates of the new memory architecture.

In one aspect, the method utilizes the absolute position of the agent in the multi-dimensional environment.

In one aspect, the agent includes a deep reinforcement learning agent.

In one general aspect, the present invention is directed to a computer system for storing data associated with an agent in a multi-dimensional environment. The computer system includes a set of one or more processor cores and a memory coupled to the processor cores. The memory stores a memory architecture including one or more features stored at coordinates corresponding to coordinates of the multi-dimensional environment and instructions that, when executed by the processor, cause the computer system to perform the method described above.

In one aspect, the memory includes a first memory storing the memory architecture and a second memory storing the instructions.

In one general aspect, the present invention is directed to a computer-implemented method for ego-centrically storing data associated with an agent in a multi-dimensional environment via a memory architecture. The memory architecture utilizes a coordinate system that stores one or more features of the environment at coordinates that correspond to the coordinates of the multi-dimensional environment. The method includes transforming, by a set of one or more processor cores, the memory architecture according to a velocity of the agent. The method further includes generating, by the set of processor cores, a summary of the one or more features stored throughout the memory architecture. The method further includes retrieving, by the set of processor cores, one or more candidate features corresponding to center coordinates of the transformed memory architecture. The method further includes determining, by the set of processor cores, whether the one or more candidate features correspond to the summary of the one or more stored features of the memory architecture. The method still further includes updating, by the set of processor cores, the transformed memory architecture with the one or more candidate features at the center coordinates in the memory architecture that correspond to the summary of the one or more stored features of the memory architecture.

In one aspect, the method is iteratively repeated for each position of the agent as the agent traverses the multi-dimensional environment.

In one aspect, the summary of the one or more features stored throughout the memory architecture is generated by passing the memory architecture through a neural network to generate a C-dimensional feature vector, wherein C is a number of features associated with the environment.

In one aspect, it is determined whether the one or more candidate features correspond to the summary of the one or more stored features of the memory architecture comprises by computing a query vector $q_t$ according to a current state embedding $s_t$ and a feature vector $r_t$ and computing a weighted average $c_t$ according to $q_t$ and each feature vector in the memory architecture.

In one aspect, the memory architecture is updated with the one or more candidate features at the coordinates in the memory architecture that correspond to the summary of the one or more stored features of the memory architecture comprises by generating a new memory architecture including the data stored in the memory architecture, except with the one or more candidate features that correspond to one or more stored features written to the corresponding coordinates of the new memory architecture.

In one aspect, the velocity of the agent corresponds to relative movement of the agent in the multi-dimensional environment.

In one aspect, the agent includes a deep reinforcement learning agent.

In one general aspect, the present invention is directed to a computer system for ego-centrically storing data associated with an agent in a multi-dimensional environment. The computer system includes a set of one or more processor cores and a memory coupled to the processor cores. The memory stores a memory architecture including one or more features stored at coordinates corresponding to coordinates of the multi-dimensional environment and instructions that, when executed by the processor, cause the computer system to perform the method described above.

In one aspect, the memory includes a first memory storing the memory architecture and a second memory storing the instructions.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for storing data associated with an agent in a multi-dimensional environment via a memory architecture, wherein the multi-dimensional environment is an environment in which the agent moves, the method comprising:

storing, in the memory architecture of a computer memory, one or more stored features at memory coordinates corresponding to environment coordinates of the multi-dimensional environment, wherein the environment coordinates of the multi-dimensional environment correspond to locations in the environment in which the agent moves, and each unique environment coordinate corresponds to, according to a coordinate normalization function, a corresponding unique memory coordinate of the memory architecture;

(a) generating, by a set of one or more processor cores, a summary of the one or more stored features stored throughout the memory architecture;

(b) retrieving, by the set of processor cores, one or more candidate features corresponding to a current position at which the agent is located in the environment from the memory coordinates of the memory architecture corresponding to the current position of the agent in the environment;

(c) determining, by the set of processor cores, whether the one or more candidate features correspond to the summary of the one or more stored features of the memory architecture; and (d) updating, by the set of processor cores, the memory architecture with the one or more candidate features at the memory coordinates of the memory architecture that correspond to the summary of the one or more stored features of the memory architecture.

2. The computer-implemented method of claim 1, further comprising iteratively repeating steps (a)-(d) for each new position of the agent as the agent traverses the multi-dimensional environment.

3. The computer-implemented method of claim 1, wherein generating the summary of the one or more features stored throughout the memory architecture comprises:

passing the memory architecture through a neural network to generate a C-dimensional feature vector, wherein C is a number of features associated with the environment.

4. The computer-implemented method of claim 1, wherein determining whether the one or more candidate features correspond to the summary of the one or more stored features of the memory architecture comprises:

computing a query vector $q_t$ according to a current state embedding $s_t$ and a feature vector $r_t$; and computing a weighted average $c_t$ according to $q_t$ and each feature vector of the memory architecture.

5. The computer-implemented method of claim 1, wherein updating the memory architecture with the one or more candidate features at the memory coordinates of the memory architecture that correspond to the summary of the one or more stored features of the memory architecture comprises:

generating a new memory architecture comprising the data stored in the memory architecture, wherein the one or more candidate features of the new memory architecture correspond to one or more stored features written to corresponding memory coordinates of the new memory architecture.

6. The computer-implemented method of claim 1, wherein the current position of the agent corresponds to a current absolute position of the agent in the multi-dimensional environment.

7. The computer-implemented method of claim 1, wherein the agent comprises a deep reinforcement learning agent.

8. A computer system for storing data associated with an agent in a multi-dimensional environment, wherein the multi-dimensional environment is an environment in which the agent moves, the computer system comprising:

a set of one or more processor cores;

a memory coupled to the processor cores, the memory storing:

a memory architecture comprising one or more stored features at memory coordinates corresponding to environment coordinates of the multi-dimensional environment, wherein the environment coordinates of the multi-dimensional environment correspond to locations in the multi-dimensional environment in which the agent moves, and each unique environment coordinate corresponds to, according to a coordinate normalization function, a corresponding unique memory coordinate of the memory architecture; and instructions that, when executed by the processor, cause the computer system to:

(a) generate a summary of the one or more features stored throughout the memory architecture;

(b) retrieve one or more candidate features corresponding to a current position at which the agent is located from the memory coordinates of the memory architecture corresponding to the current position of the agent in the environment;

(c) determine whether the one or more candidate features correspond to the summary of the one or more stored features of the memory architecture; and (d) update the memory architecture with the one or more candidate features at the memory coordinates of the memory architecture that correspond to the summary of the one or more stored features of the memory architecture.

9. The computer system of claim 8, wherein the memory comprises a first memory storing the memory architecture and a second memory storing the instructions.

10. The computer system of claim 8, wherein the instructions further cause the computer system to iteratively repeat steps (a)-(d) for each new position of the agent as the agent traverses the multi-dimensional environment.

11. The computer system of claim 8, wherein the instructions cause the computer system to generate the summary of the one or more features stored throughout the memory architecture by causing the computer system to:

pass the memory architecture through a neural network to generate a C-dimensional feature vector, wherein C is a number of features associated with the environment.

12. The computer system of claim 8, wherein the instructions cause the computer system to determine whether the one or more candidate features correspond to the summary of the one or more stored features of the memory architecture by causing the computer system to:

compute a query vector $q_t$ according to a current state embedding $s_t$ and a feature vector $r_t$; and compute a weighted average $c_t$ according to $q_t$ and each feature vector of the memory architecture.

13. The computer system of claim 8, wherein the instructions cause the computer system to update the memory architecture with the one or more candidate features at the memory coordinates of the memory architecture that correspond to the summary of the one or more stored features of the memory architecture by causing the computer system to:

generate a new memory architecture comprising the data stored in the memory architecture, wherein the one or more candidate features of the new memory architecture correspond to one or more stored features written to corresponding memory coordinates of the new memory architecture.

14. The computer system of claim 8, wherein the current position of the agent corresponds to a current absolute position of the agent in the multi-dimensional environment.

15. The computer system of claim 8, wherein the agent comprises a deep reinforcement learning agent.

16. A computer-implemented method for storing data associated with an agent in a multi-dimensional environment via a memory architecture, the memory architecture storing one or more features at coordinates corresponding to coordinates of the multi-dimensional environment, the method comprising:
   (a) transforming, by a set of one or more processor cores, the memory architecture according to a velocity of the agent to thereby generate a transformed memory architecture;
   (b) generating, by the set of processor cores, a summary of the one or more features stored throughout the transformed memory architecture;
   (c) retrieving, by the set of processor cores, one or more candidate features corresponding to center coordinates of the transformed memory architecture;
   (d) determining, by the set of processor cores, whether the one or more candidate features correspond to the summary of the one or more stored features of the transformed memory architecture; and
   (e) updating, by the set of processor cores, the transformed memory architecture with the one or more candidate features at the center coordinates of the transformed memory architecture that correspond to the summary of the one or more stored features of the transformed memory architecture.

17. The computer-implemented method of claim 16, further comprising iteratively repeating the steps (a)— (e) for each position of the agent as the agent traverses the multi-dimensional environment.

18. The computer-implemented method of claim 16, wherein generating the summary of the one or more features stored throughout the transformed memory architecture comprises:
   passing the transformed memory architecture through a neural network to generate a C-dimensional feature vector, wherein C is a number of features associated with the environment.

19. The computer-implemented method of claim 16, wherein determining whether the one or more candidate features correspond to the summary of the one or more stored features of the transformed memory architecture comprises:
   computing a query vector $q_t$ according to a current state embedding $s_t$ and a feature vector $r_t$; and
   computing a weighted average $c_t$ according to $q_t$ and each feature vector in the transformed memory architecture.

20. The computer-implemented method of claim 16, wherein updating the transformed memory architecture with the one or more candidate features at the center coordinates of the transformed memory architecture that correspond to the summary of the one or more stored features of the transformed memory architecture comprises:
   generating a new memory architecture comprising the data stored in the transformed memory architecture, wherein the one or more candidate features of the new memory architecture correspond to one or more stored features written to the center coordinates of the new memory architecture.

21. The computer-implemented method of claim 16, wherein the velocity of the agent is based on movement of the agent in the multi-dimensional environment between time steps.

22. The computer-implemented method of claim 16, wherein the agent comprises a deep reinforcement learning agent.

* * * * *